May 24, 1966  R. D. RUMSEY  3,252,697
BEARING AND SEALING MEANS FOR A HYDRAULIC BUFFER
Original Filed Sept. 24, 1962  3 Sheets-Sheet 1
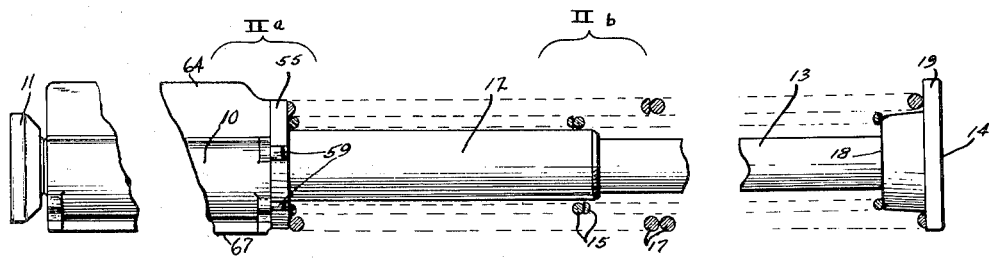
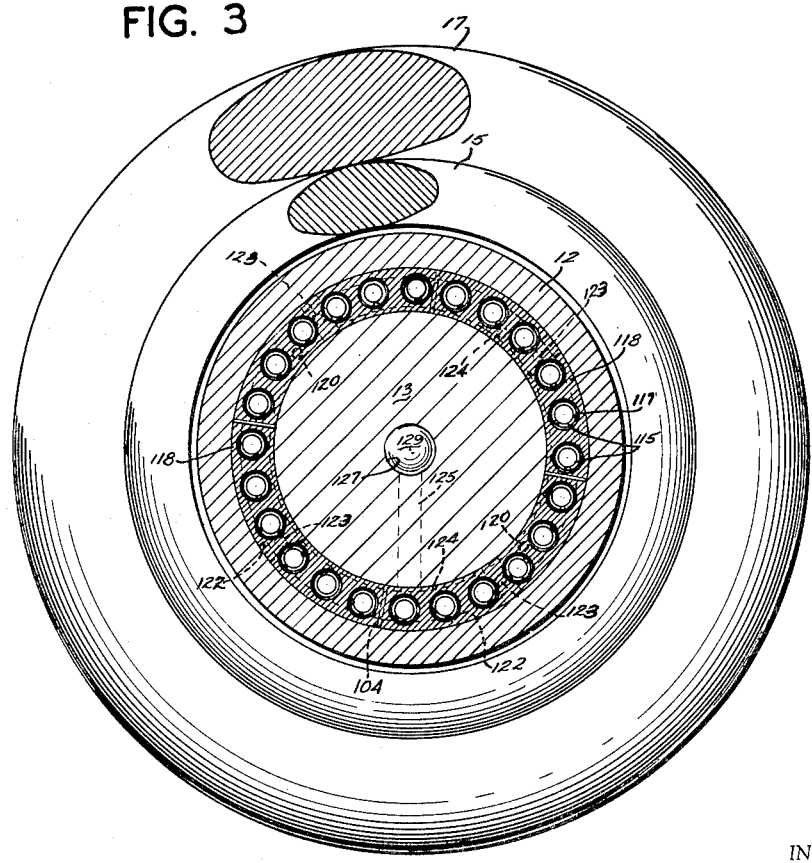
INVENTOR.
ROLLIN DOUGLAS RUMSEY
BY
ATTORNEYS

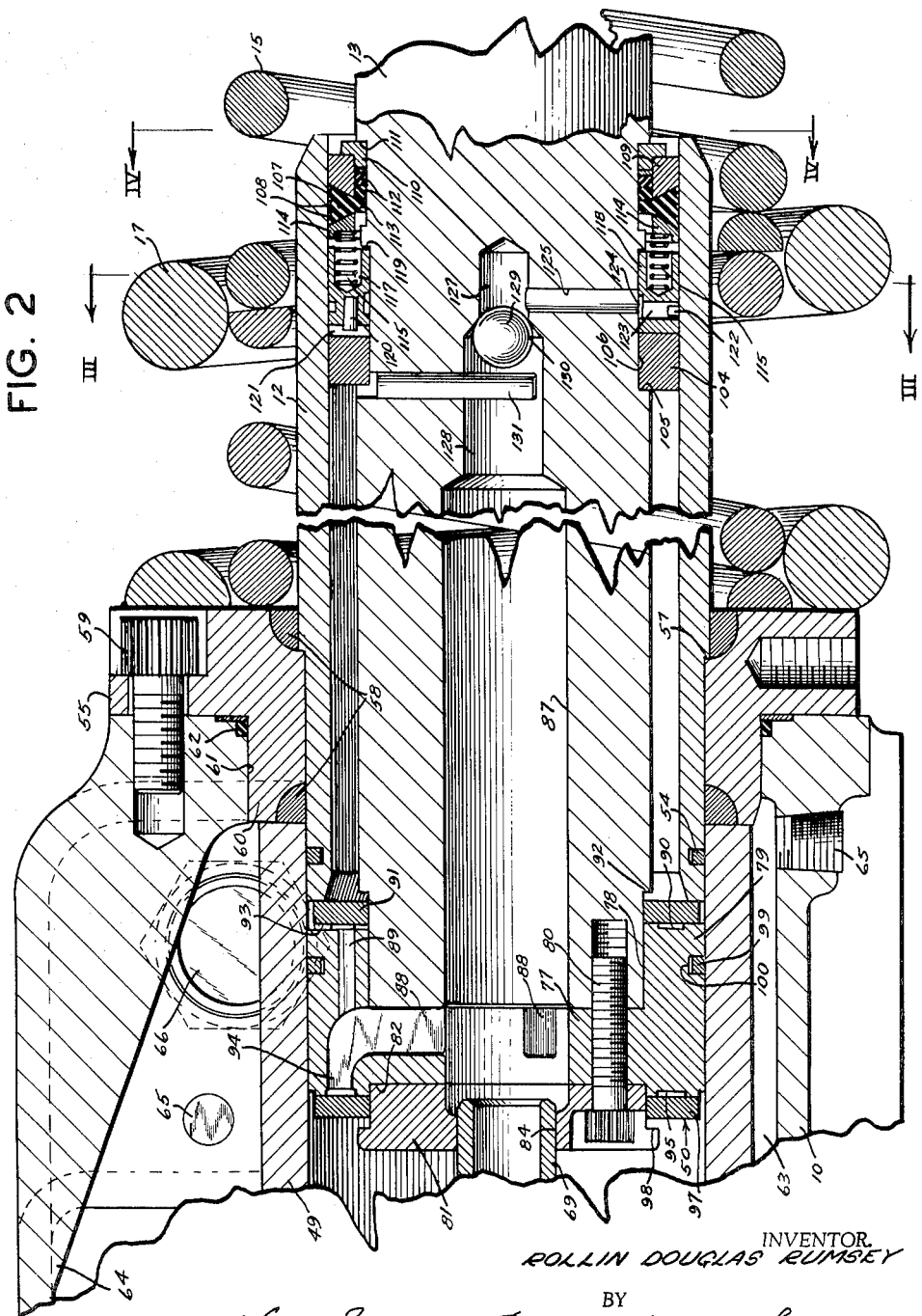

May 24, 1966 R. D. RUMSEY 3,252,697
BEARING AND SEALING MEANS FOR A HYDRAULIC BUFFER
Original Filed Sept. 24, 1962 3 Sheets-Sheet 3

INVENTOR.
ROLLIN DOUGLAS RUMSEY

United States Patent Office 3,252,697
Patented May 24, 1966

3,252,697
BEARING AND SEALING MEANS FOR A
HYDRAULIC BUFFER
Rollin Douglas Rumsey, Buffalo, N.Y., assignor to Houdaille Industries, Inc., Buffalo, N.Y., a corporation of Michigan
Original application Sept. 24, 1962, Ser. No. 225,976. Divided and this application Feb. 23, 1965, Ser. No. 434,531
12 Claims. (Cl. 267—1)

This invention relates to improvements in hydraulic shock absorbing buffers of the type capable of absorbing high loads under adverse environmental conditions, of which buffers for such uses as in aircraft, missiles, radar antenna, railway cars, and the like are examples, and more particularly concerns novel bearing and sealing means for such buffers.

The present application is a division of co-pending application Serial No. 225,976, filed September 24, 1962, now abandoned (and which, in turn, is a continuation-in-part of co-pending application Serial No. 157,981, filed December 8, 1961, now Patent No. 3,190,630, dated June 22, 1965).

Shock absorbing buffers of the heavy duty type, such as those referred to by way of example, must survive long periods of inactivity and still provide reliable operation. During inactive periods, such a buffer can become smothered in paint or dirt. Under the conditions of use of such hydraulic shock absorbing devices, maintenance is often haphazard or omitted. Pursuant to the principles of the invention covered in parent application Serial No. 225,976, the buffer is provided with a piston rod which projects through a substantial length beyond an end of the working cylinder in which the piston on the rod works in compression and return strokes. In spaced relation about the piston rod is provided a cylinder extension which not only protectively encompasses the entire portion of the piston rod which is movable into the cylinder with the piston during a working or compression stroke, but also serves to provide in the space between the piston rod and the inner surface of the cylinder extension a return stroke buffer chamber which opens at it inner end into the end of the working cylinder behind the piston. This arrangement poses substantial problems in respect to guidance bearing for the piston rod within the cylinder extension, sealing of the outer end of the buffer chamber, and avoidance of leakage from the device through the outer end of the buffer chamber.

Accordingly, it is an important object of the present invention to provide in a hydraulic shock absorbing buffer novel, highly efficient bearing and sealing means.

Another object of the invention is to provide external dynamic seals especially suitable for heavy duty buffer constructions of the type indicated, and which seals do not rub over a surface exposed to dirt, weather and paint.

A further object in the invention is to provide a new and improved external dynamic seal for the purpose indicated having automatic wear compensating take-up characteristics.

Still another object of the invention is to provide a new and improved bearing and sealing assembly for buffers as described, in which a new and improved relationship of bearing and sealing parts is attained.

A still further object of the invention is to provide a new and improved seal and bearing construction for the purpose indicated affording a new and improved assembly of parts greatly facilitating mounting of the assembly on a cylindrical piston rod surface.

Yet another object of the invention is to provide a new and improved bearing and seal assembly of the character described eliminating the need for any attaching means to retain the same in assembly with one of a pair of relatively reciprocably operable members.

Other objects, features and advantages of the present invention will be readily apparent from the following detailed description of a preferred embodiment thereof taken in conjunction with accompanying drawings, in which:

FIGURE 1 is a fragmental side elevational view of a hydraulic shock absorbing buffer embodying a bearing and sealing construction according to the present invention.

FIGURE 2 is an enlarged fragmental sectional elevational detail view longitudinally through the buffer depicting the structure within substantially those portions of the length of the unit indicated by the brackets IIa and IIb of FIGURE 1.

FIGURE 3 is a transverse sectional detail view taken substantially on the line III—III of FIGURE 2.

Figure 4:
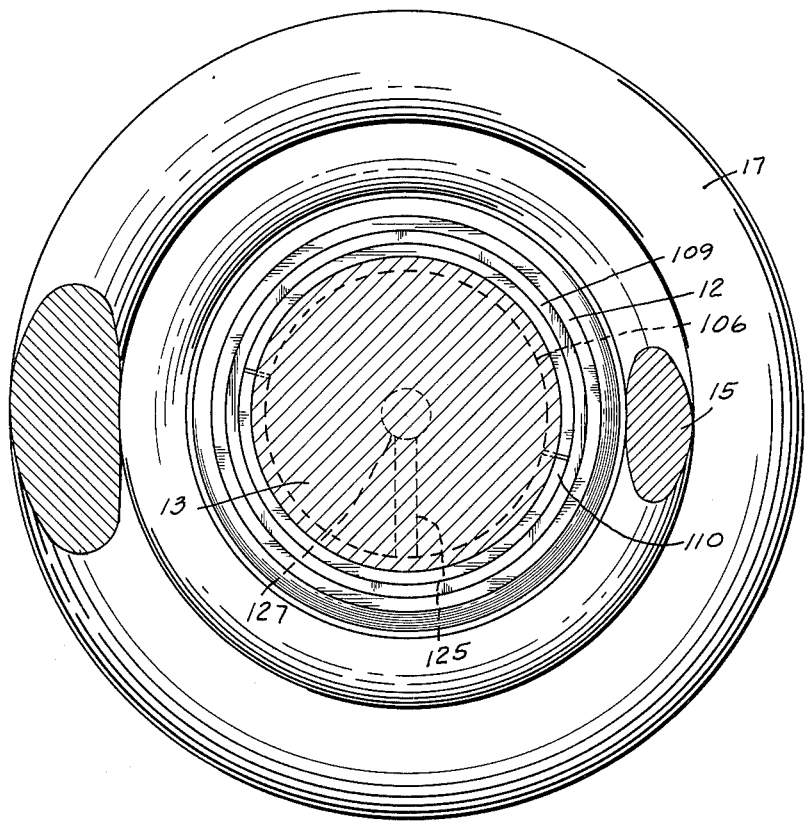
FIGURE 4 is a transverse sectional elevational detail view taken substantially on the line IV—IV of FIGURE 2.

A hydraulic shock absorbing buffer as depicted in FIGURE 1 is constructed and arranged for use in a substantially horizontal position and to provide for a substantial range of shock absorbing travel of the active components. To this end, the buffer includes an elongated main body or housing 10 carrying on one end a buffer head or follower 11. Projecting fixedly from the opposite end of the housing 10 is a tubular cylinder extension 12 through which extends reciprocably a long piston rod 13 carrying on its outer end or distal extremity a buffer follower 14 facing opposite to the follower 11.

Normally maintaining the housing 10 and the piston rod 13 projected to maximum extent are inner and outer helical compression spring structures 15 and 17. One end of the spring structure 15 abuts a shoulder 18 on the follower 14 and the adjacent end of the spring structure 17 abuts against a flange 19 of such follower.

Within the housing 10, hydraulic cylinder and piston means are so thoroughly enclosed as to preclude contamination by dirt or other foreign matter from outside of the buffer unit, and further, thoroughly protected against damage from external forces and supported against working load stresses by the rugged housing. In an economical construction minimizing machining and more particularly fine, close tolerance machining of working surfaces, a separate tubular working cylinder 49 is provided (FIG. 2) of a length to extend substantially throughout the interior length of the housing 10. Reciprocably slidably engaging the inner cylindrical surface of the cylinder 49 is a piston 50 carried by the inner end of the piston rod 13.

Mounting of the cylinder 49 within the housing 10 is effected at the head end of the assembly by suitable means (not shown). At its opposite end, the cylinder tube 49 is located adjacent to but spaced a limited distance inwardly from the adjacent end of the housing 10, and is supported concentrically by the inner end portion of the cylinder extension 12 telescoped to a short extent into the working cylinder, a high pressure seal being afforded in the telescoped joint as by means of a piston ring 54. This cylinder assembly is rigidly secured to the adjacent end of the housing 10 by means of an attachment flange 55 of rugged construction encircling and seating on the extension cylinder 12 adjacent to the telescoping end portion and abutting a locating shoulder 57 provided on the outer perimeter of the cylinder extension. Permanent and completely fluid sealed attachment of the flange member 55 to the cylinder extension 12 is effected by means of axially spaced concentric annular welds 58. Screws 59 secure the flange 55 to the adjacent end of the housing 10, a centering boss portion 60 of the flange fitting within a concentric bore 61 in the end portion of the housing. An annular seal structure 62 prevents leakage of fluid through the joint between the housing and the flange.

Within the cylinder 49, a filled hydraulic system is maintained with a hydraulic fluid such as a substantially non-viscous oil which is supplied to the cylinder from a reservoir 63 within the housing 10 which is provided with an upwardly projecting longitudinal reservoir enlargement 64. A plug 65 closes a filler opening into the reservoir, and an oil sight gauge or window 66 is provided in the side of the reservoir enlargement 64. For additional details of fluid transfer between the cylinder 49 and the reservoir 63 attention is invited to the parent application.

Concentric within the cylinder 49 is a metering tube 69 which cooperates with the piston 50 having a head or body 77 provided with an enlarged central bore to receive the metering tube axially therethrough. A central complementary recess or cavity 78 in the back of the piston head is defined by a rearwardly projecting flange portion 79 and receives the inner end portion of the piston rod 13 therein. Screws 80 secure the piston head and a bearing ring member 81 in place on the end of the rod. The ring member 81 is seated in a centering recess 82 in the piston head.

Slidable bearing of the metering tube 69 through a bearing bore 84 in the ring 81 guides the tube concentrically through the piston head 77 and into an elongated metering tube or rod receiving a clearance bore 87 opening through the inner end of the piston rod and extending to a length which will receive the metering tube 69 in the maximum closing or inward working stroke limit of telescoping of the piston 50 within the working cylinder 49. During such telescoping or closing stroke of the piston, metering of hydraulic fluid into an area back of the piston head 77 is through radial passages 88, metering orifices 89 and an annular groove 90 controlled by a plate disk valve member 91 adapted to unseat toward a limit shoulder 92 on the piston rod. During the inward or working stroke of the piston, therefore, hydraulic fluid is adapted to be displaced into the area in back of the piston. During return or rebound strokes of the piston the groove 90 is closed except for a limited metering passage provided by radial groove 93 across the end of the piston flange 79 and intersecting the groove 90 whereby to afford return stroke damping.

During return strokes of the piston, at least some of the hydraulic fluid passes from the bore of the metering tube 69 through the passages 88 and forwardly through legs 94 of such passages and an annular groove 95 in the front face of the piston head and past a ring disk plate valve 97 which is displaced against a limit shoulder 98 on the ring member 81. During inward working stroke, the valve member 97 closes the groove 95. A piston ring 99 is carried within a groove 100 in the perimeter of the piston head 77 affording a seal with the inner cylindrical wall of the cylinder 49.

According to the present invention, improved bearing support for the piston rod 13 within the cylindrical extension portion 12 is afforded and the return stroke buffer chamber within the cylindrical extension is thoroughly sealed against leakage from its outer end by means of a new and improved bearing and sealing assembly carried by the piston rod and fully protected from external dirt and other contaminants throughout the range of travel of the piston rod within the cylinder extension 12. To this end, a bushing bearing structure 104 is mounted about the piston rod 13 and seated on an annular rearwardly or outwardly facing shoulder 105 located at the inner or forward end of an annular reduced diameter area or portion 106 of the rod. Such mounting of the bearing is at a suitable distance axially spaced from the piston 50 to assure continuous bearing engagement of the bushing bearing with the opposed internal bearing wall bore of the cylinder extension 12 throughout the operative reciprocable travel of the piston relative to the working cylinder 49. In the fully extended condition of the buffer unit, the bearing 104 is fully protected interiorly of the elongated cylinder extension 12 against any external dirt or other contaminants and it always rides a clean, lubricated and smooth surface provided by the bore of the cylinder extension. An incidental benefit of this particular structural relationship is that no direct sliding bearing area need be provided on the piston rod 13, thus substantially saving machining costs and also enabling the piston rod to be made from less expensive material than where it would be required to withstand bearing wear.

Because the bearing 104 serves also as the dynamic closure for the hydraulic fluid chamber space back of the piston 50 between the smaller diameter piston rod 13 and the bore of the extension cylinder 12, a dynamic fluid sealing structure is provided outwardly adjacent to the bearing ring. In a practical construction, a sealing ring 107 is provided which is of generally trapezoidal cross-section with its dynamic sealing face on its greater width and facing radially outwardly for sliding sealing engagement with the opposing bore of the extension cylinder 12. A series of annual wiper lips 108 facing in the inward direction on the dynamic periphery of the sealing ring 107 assure substantially complete wiping of hydraulic fluid on the opposed cylinder extension surface during a compression or inward stroke of the piston. A rubber type material such as a suitable synthetic compound is desirably utilized in the seal member 107.

Means are provided in the seal structure assembly for maintaining the resilient seal member 107 under efficient sealing compression, including at the axially outer side thereof a rigid retainer bearing and packing ring 109 which slidably engages the inner cylindrical wall of the extension 12. An opposing inner annular face on the ring 109 is complementary to the oblique engaged axial side of the sealing ring 107. The ring 109 is of smaller inside diameter than the normal diameter of the piston rod 13 so that it can be easily moved into assembly longitudinally thereover. Position of the ring 109 concentrically with the extension cylinder 12 and the piston rod 13 is maintained by a split retainer ring 110 (FIG. 4) of generally L-shaped cross-section as shown (FIG. 2) and providing a seat within its reentrant angle for the ring 109, and, in turn, seated within the reduced diameter area 106 and against an inwardly facing retaining shoulder 111 provided therefor on the piston rod 13 at the axially outer end of the sealing structure accommodating peripheral recess or area.

Between the inner end of the retainer ring 110 within a space provided between the inside diameter of the packing ring 109 and the adjacent recessed perimeter of the piston rod a plurality of coactive fluid sealing packing rings 112 back up a relatively elastically flexible radially inwardly extending narrow peripheral annular sealing flange 113 on the sealing ring 107. This flexible flange enables the inner perimeter portion of the sealing member 107 to be assembled into the seal-recess area 106 of the piston rod 13 by elastically stretching the flange over the normal or full diameter of the piston rod during relatively axially sliding assembly movement of the seal structure along the piston rod. When the seal member reaches the recessed area 106, it snaps thereinto with its inner edge confronting the piston rod in the recess. By virtue of the thorough sealing back-up afforded for the flange 113 and supplemental sealing effected by the packing rings 112, quite thorough static sealing against leakage of hydraulic fluid past the piston rod 13 is assured.

While the rigid packing ring 109 affords a static compression back-up for the sealing ring 107, a dynamic wear compensating rigid take-up thrust or compression ring 114 of substantially the same inside and outside diameter as the packing ring 109 has a complementary engagement and compression face on its axially outer end thrusting against the axially inwardly facing oblique side of the sealing ring 107. It will be observed that both of the packing rings 109 and 114 are continuous annuli.

Uniform, resilient take-up compression force is exerted axially on the compression packing ring 114 toward the sealing ring 107 by means desirably comprising an annular series of uniformly closely spaced coiled compression springs 115 thrusting against the axially inner side of the ring 114 and seated in respective axially outwardly opening sockets 117 in a combination split ring retainer and bearing bushing 118 (FIGS. 2 and 3) which seats against the axially outer face of and supplements the bearing 104. The bushing 118 is of substantially the same inside and outside diameter as the bearing bushing 104. Positive retention of the bushing 118 in spaced relation to the packing ring 114 and in piston rod bearing support association with the bearing 104 is assured by a shoulder 119 on the piston rod opposing the axially outer end of the bushing.

Assembly of the bushing 118 snugly about the piston rod 13 within the reduced diameter area of the piston rod to accommodate the bushing is facilitated by constructing the bushing in a plurality of equal segments, such as two, as shown in FIGURE 3, which can easily be accomplished by making the bushing in one piece and then severing it. For the same purpose, the bearing 104 may be split, as for example into two segments. Then, to orient the segments of the bearing 104 and the bushing 118 with the respective split joints out of alignment to minimize hydraulic fluid leakage, orientation pins 120 carried by the respective segments of the bushing (FIGS. 2 and 3) project into respective alignment notches 121 formed in the opposing face of the bearing 104.

It will thus be apparent that assembly and retention of the bearing and seal assembly in operative relation on the piston rod 13 and within the cylinder extension 12 is readily effected without any need for special pins, snap rings, threaded devices, and the like. For example, in an orderly assembly sequence, the split ring bearing 104 may first be mounted in the recess 106 against the shoulder 105 while the extension cylinder 12 and the piston rod 13 are relatively separated sufficiently to expose the annular recess 106 at the outer or rear end of the cylinder extension. Similar assembly of the split bushing 118 is also effected and the cooperative split ring members as thus assembled and seated are moved into the cylinder extension 12, whereby they are retained within the recess 106 as well as between the axially opposed shoulders 105 and 119. Then the compression springs 115 are mounted in their sockets 117 and the packing ring 114 moved into position over the piston rod 13. Following this, the packing ring 107 is slid into place and the packing ring 109 and the packing rings 112 are assembled against the packing ring 107. Axially inward pressure applied to the assembly as thus far effected, in opposition to the springs 115, affords room for the split retainer ring 110 to be mounted in position within the outer end of the recess 106 and against the shoulder 111. The entire assembly is thus completed and operative upon movement of the entire assembly into the outer or rear end portion of the cylinder extension 12.

During high pressure inward working strokes of the piston 50 the hydraulic fluid flow displacement path area from the metering tube 69 to the reservoir 63 is sufficiently larger than the flow path area out of the distal or piston rod end of the metering tube into the interior chamber 87 in the piston rod and thence through the working piston passages 88 and 89 into the chamber area back of the working piston to insure that no excessively high pressure reaches the chamber area back of the piston to interfere with the buffing strength of the inward pressure stroke or to impose any such high pressure on the external seal structure including the sealing ring member 107. Desirably the flow between the reservoir end and the piston rod end of the metering tube 69 is divided in a ratio of approximately 3 to 1 for this purpose. This achieves a pressure drop behind the working piston on the closing stroke substantially equal to that from the interior of the metering tube into the reservoir and avoids build up of pressure on the piston rod seal during its closing action. Any pressure surges that may travel back of the piston assembly 50 toward the seal 107 are substantially restrained and prevented from adversely affecting the seal, by the bearing 104 and the bearing bushing 118, together, serving as a high pressure barrier.

Moreover, during return stroke damping action wherein a low order of pressure is developed in the chamber space back of the working piston 50, as compared with the pressures developed in the working cylinder during the inward damping stroke of the working piston, not only does the bearing 104 with the bearing bushing 118 function to prevent pressure from reaching the seal 107, but pressure relief for any possible leakage thereby is afforded from the area between the bearing and the seal. For this purpose, a hydraulic fluid drain-off passageway is afforded from the area at the inner side of the seal member 107 and between the packing ring 114 and the piston rod 13 rearwardly of the bushing 118, through the plurality of separations in the bushing 118, an external annular drain groove 122 in the bushing, respective radial bores 123 in the bushing segments and by way of an annular internal diameter groove 124 in the bushing into an aligned radial passage bore 125 in the piston rod 13 communicating with a central blind end reduced diameter terminal counterbore 127 leading axially from the inner end of a stepped counterbore portion 128 at the inner terminus of the central passage bore 87 of the piston rod 13. During inward pressure strokes of the working piston, the passage counterbore 127 is closed by a check valve in the form of a ball 129 seating on a valve seat 130 at the inner end juncture of the counterbore portion 128 with the counterbore portion 127. During the return stroke movements of the piston pressure relief and hydraulic fluid drainage from the seal through the drainage passageway system is enabled by unseating of the ball valve 129 which is retained adjacent to its seat during such unseating movement by a suitable retaining pin 131 extending across the counterbore portion 128.

It will be understood that modifications and variations may be effected without departing from the scope of the novel concepts of the present invention.

I claim as my invention:

1. In a hydraulic buffer construction including a housing having a cylinder and a piston operative therein with a piston rod projecting substantially beyond one end of the housing,
   a cylinder extension about a substantial portion of the piston rod in spaced relation and defining a return stroke buffer chamber back of the piston,
   a bearing mounted on the piston rod substantially spaced from the piston and engaging slidably within the cylinder extension and providing a closure for the return stroke chamber,
   a reduced diameter portion on the piston rod mounting said bearing,
   a bearing seal and means also mounted in said reduced diameter portion and retaining said seal between the bearing and said means.

2. In a hydraulic buffer construction including a housing having a cylinder and a piston operative therein with a piston rod projecting substantially beyond one end of the housing,
   a cylinder extension about a substantial portion of the piston rod in spaced relation and defining a return stroke buffer chamber back of the piston,
   a bearing mounted on the piston rod substantially spaced from the piston and engaging slidably within the cylinder extension and providing a closure for the return stroke chamber,
   a reduced diameter portion on the piston rod mounting said bearing,
   a bearing seal and means also mounted in said reduced diameter portion and retaining said seal between the bearing and said means, said seal including a resilient sealing ring,
said retaining means including a static compression means opposing said sealing ring,
and yieldably biased dynamic compression means bottomed on said bearing and thrusting against the opposite side of said sealing ring.

3. In a hydraulic buffer construction including a working cylinder and an extension cylinder,
a piston rod having a piston thereon operatively engaged in the working cylinder,
passage means for hydraulic fluid through the piston to the back thereof,
a split bearing ring mounted on the piston rod substantially spaced from said piston and defining with the piston and between the piston rod and the extension cylinder a return stroke buffing chamber,
a second split bearing ring mounted on the rod and engaging the first mentioned split bearing ring outside of the return stroke chamber,
a resilient sealing ring of trapezoidal shape in cross-section mounted on the rod with its widest face sealingly engaging within the cylinder extension adjacent to said second bearing ring but outside of said chamber,
static retaining and comprission ring means engaging the side of the sealing ring remote from said bearing rings,
a dynamic compression ring engaging the side of the sealing ring nearest the bearing rings,
said second bearing ring having a circular series of sockets therein opening toward said dynamic compression ring means,
a set of compression springs seated in said sockets and thrusting against said dynamic compression ring,
and means retaining said rings and ring means as an assembly against axial displacement along the rod.

4. In a hydraulic buffer construction including a working cylinder and an extension cylinder,
a piston rod having a piston thereon operatively engaged in the working cylinder,
passage means for hydraulic fluid through the piston to the back thereof,
a split bearing ring mounted on the piston rod substantially spaced from said piston and defining with the piston and between the piston rod and the extension cylinder a return stroke buffing chamber,
a second split bearing ring mounted on the rod and engaging the first mentioned split bearing ring outside of the return stroke chamber,
a resilient sealing ring of trapezoidal shape in cross-section mounted on the rod with its widest face sealingly engaging within the cylinder extension adjacent to said second bearing ring but outside of said chamber,
static retaining and compression ring means engaging the side of the sealing ring remote from said bearing rings,
a dynamic compression ring engaging the side of the sealing ring nearest the bearing rings,
said second bearing ring having a circular series of sockets therein opening toward said dynamic compression ring means,
a set of compression springs seated in said sockets and thrusting against said dynamic compression ring,
said piston rod having pressure relief passage therein and said second ring bearing having pressure relief passages from said sealing ring communicating with said passage in the piston rod,
and means retaining said rings and ring means as an assembly against axial displacement along the rod.

5. In a hydraulic device of the type including a working cylinder,
a piston in the working cylinder and having a piston rod projecting to a substantial extent beyond the working cylinder,
an extension from the cylinder concentrically surrounding the piston rod and having a cylindrical surface which is of a limited larger diameter than the diameter of the piston rod,
annular bearing means and fluid sealing means on the piston rod located to engage said cylindrical surface adjacent to the distal end of the extension in the fully extended position of the piston rod and thereby sealing said cylindrical surface against entry of dirt or contaminants,
said bearing means comprising a ring-shaped member,
a retainer member spaced axially from the ring-shaped bearing member,
means holding said bearing member and said retaining member in fixed axial relation,
said sealing means comprising a trapezoidal sealing ring, between said bearing member and said retainer member, having its widest portion opposing the cylindrical surface and including a relatively elastically flexible radially inwardly extending narrow annular sealing flange engaging the piston rod,
and means between the bearing ring and the sealing ring effecting expanding thrust against the sealing ring to thrust it against said retaining member and maintain the sealing ring in continuously firm sealing engagement with the cylindrical surface.

6. In a hydraulic device including a working cylinder having a cylindrical extension therefrom with a piston operable in the working cylinder and having a piston rod of smaller diameter than the internal diameter of the extension extending therethrough,
the rod carrying thereabout adjacent to the outer end of the extension in the extended position of the rod a pair of axially spaced ring-shaped elements at least one of which is in sliding bearing engagement with the internal surface of the extension,
a ring-shaped seal mounted between said spaced elements in sealing engagement with said internal surface and having a relatively elastically flexible and radially inwardly extending narrow annular sealing flange engaging the piston rod,
and means retaining said ring-shaped elements and the seal therebetween as an assembly against axial displacement along the rod.

7. A hydraulic device as defined in claim 6, in which said rod is of larger diameter in both axial directions from a reduced diameter portion, and said annular seal flange of the ring-shaped seal by reason of its flexibility enabling assembly into the reduced diameter portion by stretching over an axially adjacent portion of the rod.

8. In a hydraulic device of the character described including relatively reciprocably related concentrically telescoped members one of which has an internal cylindrical surface and the other of which has a smaller diameter external cylindrical surface,
an annular recess in one of said cylindrical surfaces defined at its opposite ends by respectively opposingly axially facing shoulders,
a segmental annular bearing seated in said recess against one of said shoulders and bearingly engaging the cylindrical surface of the other of said members,
a resilient sealing ring seated in said recess and sealingly engaging said cylindrical surface of the other of said members,
static packing ring means retained by the other of said shoulders and engaging the side of said sealing ring away from said segmental bearing ring,
compression means thrusting against said segmental bearing ring and against the side of the sealing ring facing toward said bearing ring,
said compression means including an annular series of compression springs and an annular segmental bushing seated in said recess against said bearing ring and having respective sockets in which the springs are seated to thrust the bushing toward the sealing ring, and means maintaining said bushing relatively oriented with respect to said bearing ring with the joints between segments out of alignment.

9. A device as defined in claim 8 in which said last mentioned means comprise orientation pins carried by the respective segments of the bushing and the respective segments of the bearing ring having alignment notches into which the pins extend.

10. A device as defined in claim 8 in which said compression means include also a compression ring interposed between said springs and said sealing ring.

11. In a hydraulic device of the character described including relatively reciprocably related concentrically telescoped members one of which has an internal cylindrical surface and the other of which has a smaller diameter external cylindrical surface, an annular recess in one of said cylindrical surfaces defined at its opposite ends by respectively opposingly axially facing shoulders, a segmental annular bearing seated in said recess against one of said shoulders and bearingly engaging the cylindrical surface of the other of said members, a resilient sealing ring seated in said recess and sealingly engaging said cylindrical surface of the other of said members, static packing ring means retained by the other of said shoulders and engaging the side of said sealing ring away from said segmental bearing ring, compression means thrusting against said segmental bearing ring and against the side of the sealing ring facing toward said bearing ring, said static packing ring means comprising a rigid packing ring clear of said recess and affording a space therewith and directly engaging against the sealing ring, a segmental retaining ring seating said rigid packing ring and in turn seated in said recess against said other shoulder, and sealing packing means between said retaining ring and said sealing ring in said space.

12. In a hydraulic device of the character described including relatively reciprocably related concentrically telescoped members one of which has an internal cylindrical surface and the other of which has a smaller diameter external cylindrical surface, an annular recess in one of said cylindrical surfaces defined at its opposite ends by respectively opposingly axially facing shoulders, a segmental annular bearing seated in said recess against one of said shoulders and bearingly engaging the cylindrical surface of the other of said members, a resilient sealing ring seated in said recess and sealingly engaging said cylindrical surface of the other of said members, static packing ring means retained by the other of said shoulders and engaging the side of said sealing ring away from said segmental bearing ring, compression means thrusting against said segmental bearing ring and against the side of the sealing ring facing toward said bearing ring, said static packing ring means comprising a rigid packing ring clear of said recess and affording a space therewith and directly engaging against the sealing ring, and a segmental retaining ring seating said rigid packing ring and in turn seated in said recess against said other shoulder.

References Cited by the Examiner

UNITED STATES PATENTS

| 1,444,248 | 2/1923 | Hofmann. | |
| 1,831,136 | 11/1931 | Reed | 267—65 |
| 1,950,013 | 3/1934 | Sefton | 267—65 |
| 2,094,882 | 10/1937 | Garnett et al. | |
| 2,231,332 | 2/1941 | Griepenstroh | 267—64 |
| 2,527,980 | 10/1950 | Bachman | 267—64 |
| 2,880,022 | 3/1959 | Schultze | 277—115 |
| 3,048,412 | 8/1962 | Baker | 277—115 X |

FOREIGN PATENTS 18,844      1896    Great Britain.

ARTHUR L. LA POINT, *Primary Examiner.*

W. B. WILBER, *Assistant Examiner.*